United States Patent [19]

Konstant

[11] 3,918,140
[45] Nov. 11, 1975

[54] SNAP-FASTENER SETTING TOOL
[76] Inventor: Anthony N. Konstant, 902 W. Gregory, Mount Prospect, Ill.
[22] Filed: Apr. 29, 1974
[21] Appl. No.: 464,854

[52] U.S. Cl. .................. 29/271; 29/278; 24/217
[51] Int. Cl.² ................... B25B 27/14; A44B 17/00
[58] Field of Search ......... 29/270, 271, 278, 203 H, 29/464, 468; 24/150 C, 217, 217 W, 218; 145/64

[56] References Cited
UNITED STATES PATENTS

| | | | |
|---|---|---|---|
| 1,955,945 | 4/1934 | Cameron | 269/54.1 |
| 2,177,232 | 10/1939 | Tinnerman | 29/278 |
| 3,102,318 | 9/1963 | Van Buren, Jr. | 29/464 |
| 3,725,993 | 4/1973 | Siler | 29/271 |

Primary Examiner—Al Lawrence Smith
Assistant Examiner—Harold P. Smith, Jr.
Attorney, Agent, or Firm—Fitch, Even, Tabin & Luedeka

[57] ABSTRACT

Mating snap fasteners adapted for securing a cover to a fixed object, e.g., a boat. One fastener has aperture means disposed concentrically therein and the other fastener contains a concentric hole. A setting tool has a handle, a shank and an extending pin which has a lower end that fits into the aperture means. Insertion of the pin through the hole and into the aperture means facilitates mating the snap fasteners because leverage obtained by moving the handle easily stretches the cover and brings said snap fasteners into alignment. The shank may include a cavity into which the pin upper portion can retract and a spring biasing it to the extended position. In such case, depression of the handle permits the lower end of the shank to press the aligned fasteners into final mating engagement.

8 Claims, 5 Drawing Figures

SNAP-FASTENER SETTING TOOL

This invention relates to snap fasteners and more particularly to snap fastener pairs wherein one is mounted to a fixed object and the other is mounted to a cover or the like.

Nearly everyone who has owned a convertible automobile has experienced the difficulty in attempting to snap the boot into place over the retracted convertible top. The difficulty is usually present even when the automobile is new, and it usually becomes magnified after weathering has resulted in some shrinkage of the boot material.

Present day enthusiasm for the sport of boating has now resulted in the similar problems for boating enthusiasts. Snap fasteners are usually employed to attach canvas or other weather-resistant covers to the structure of the boat to cover the open regions. The weathering which occurs as a result of intense sunshine and relatively high humidity is more pronounced than that experienced by a convertible owner.

Better arrangements for facilitating the mating of such snap fasteners has long been desired, and it is an object of the present invention to provide a combination of apertured, mating snap fasteners and a hand tool which will provide for the easy interconnection thereof.

A further object of this invention is to provide a simple hand tool which can be employed to align and then snap together specially designed snap fasteners.

Other objects of the invention will be apparent from the following detailed description of certain preferred embodiments when read in conjunction with the accompanying drawings wherein.

Figure 1:
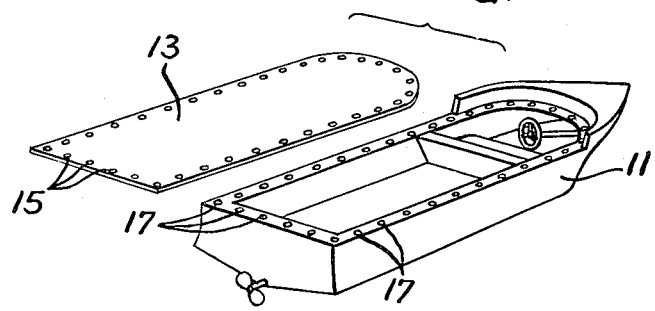
FIG. 1 is a perspective view showing a simple inboard motorboat plus a cover for the cockpit and remaining open region of the boat.

FIG. 1 depicts a simple inboard motor boat 11 having a cover 13 which is cut to fit over and close the entire cockpit remaining open cargo or passenger region of the boat. Attached to the periphery of cover 13 are a plurality of female snap fasteners 15 which are constructed to mate with male snap fasteners 17 which are affixed to the structure of the boat 11, generally in the region of the gunwales.

Figure 2:
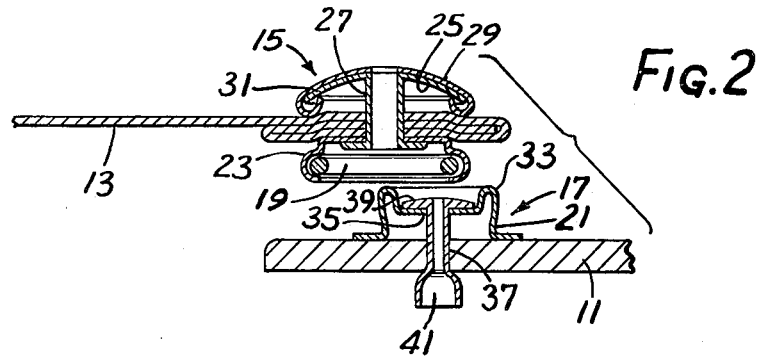
FIG. 2 is a fragmentary enlarged sectional view of a portion of the cover and of the boat structure, showing an attached snap fastener pair disposed in their approximate relation to each other when the user is attempting to complete the securing of the cover after having previously snapped together those fasteners located along the other side edge of the cover.

In the embodiment shown in FIG. 2, each of the fasteners 15 attached to the cover 13 has a femal connecting part 19 in the form of a ring, which fits about a circular male connecting part 21 of the fasteners affixed to the boat. More specifically, the female fasteners 15 each have a lower formed metal body 23 which surrounds and supports the connecting ring 19 and which is disposed on the underside of the cover 13. The illustrated fastener 15 includes an upper metal portion 25 that includes a hollow stem or post 27 which extends through a suitable passageway in the cover 13, and it is noted that the cover 13 is usually folded upon itself one or more times in this region for reinforcement purposes. The lower end of the hollow stem 27 protrudes through a suitable central opening in the lower body 23, and the protruding end is peened to complete this connection. To provide a finished appearance, an upper cap 29 having a rolled peripheral edge 31 is applied over the head of the upper part 25.

The lower male part 21 is also formed of metal to have an upstanding circular rim 33 with a generally dish-shaped interior wherein an aperture 35 is concentrically located. A pop rivet 37 having a flat head 39, which is accommodated in the dish-shaped interior, extends through the concentric aperture 35 of the boat 11 where the bottom end 41 of the pop rivet area is expanded to complete the connection.

Figure 3:
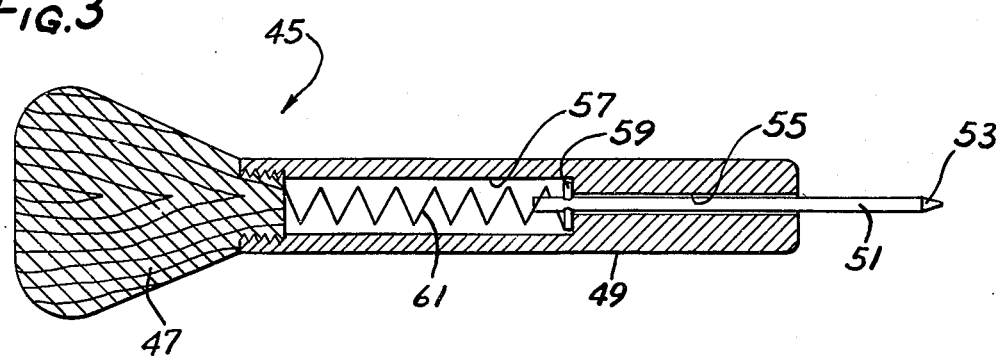
FIG. 3 is an enlarged sectional view showing a hand tool designed to assist in the mating of the snap fasteners shown in FIG. 2.

FIG. 3 depicts a setting tool 45 for assisting in the interconnection of the pairs of snap fasteners. The tool 45 includes a handle 47 which is suitably connected to a stock 49 from which an elongated pin 51 protrudes. The pin 51 has a pointed, generally conical lower end 53. Pin 51 in the illustrated embodiment is telescopically mounted in the stock 49 of the tool. Alternatively, the tool 45 could employ a rigidly mounted pin which could be used to align the fastener pairs and merely hold them in this disposition while they are snapped together using the fingers of the other hand.

The stock 49 includes an elongated passageway 55 of a size closely approximating the diameter of the pin leading from the bottom end to an enlarged cavity 57 provided in the upper end thereof. A retainer 59 of generally disc-shape is connected to the upper end of the pin 51, and a compression spring 61 bears against the upper surface of the retainer disc 59, biasing the pin 51 to the extended position. By suitably proportioning the pin 51 and the interior surface of the elongated passageway 55, sufficient bearing surfaces should be obtained; however, if desired, a sleeve-type retainer could be provided in order to provide additional sliding bearing surface at the interior sidewall of the cavity 57.

Because boat covers 13 are usually cut to provide a tight fit, some stretching of the cover will often be required after fasteners have been mated along one edge of the cover before the fasteners can be mated along the opposite edge thereof. Such a situation is illustrated in FIG. 2 where it can be seen that the axis of the upper or female fastener 15 is laterally displaced from the male fastener 17 which is mounted on the boat gunwale. However, mating of these fasteners can be easily accomplished using the setting tool 45.

Figure 4:
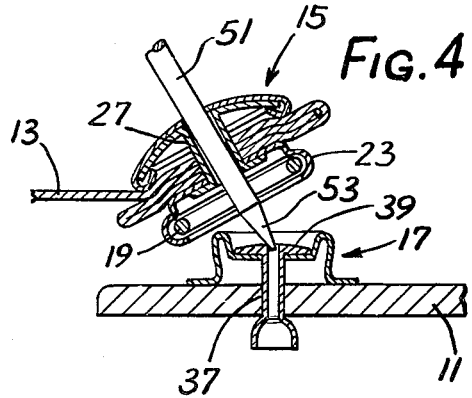
FIG. 4 is a diagrammatic sectional view showing the use of the tool depicted in FIG. 3 to achieve alignment of the mating snap fasteners.

The pin 51 is inserted through the hole in the hollow stem 27 of the female fastener 15, as illustrated in FIG. 4. The lower conical tip 53 on the pin is inserted into the apertured head 39 of the pop rivet 37 which mounts the male fastener 17. With the lower pin end 53 set in the apertured male fastener, substantial leverage can be applied by moving the handle 47 and stock 49 to the vertical position. The leverage facilitates the stretching of the cover 13 until the male and female fasteners are in vertical alignment with each other.

Figure 5:
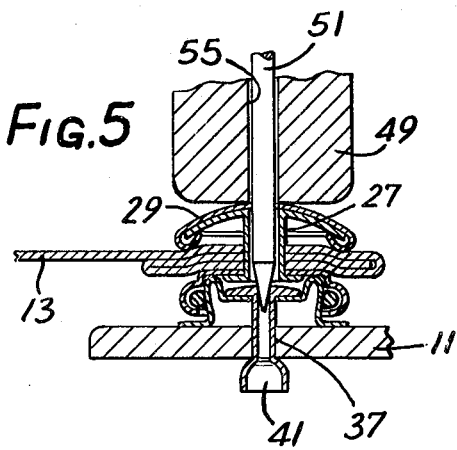
FIG. 5 is a view similar to FIG. 4 showing the final mating of the snap fastener pair.

At this point, downward pressure exerted upon the handle 47 causes the telescoping of the pin 51 into the cavity 57 in the tool stock 49. As the lower end of the stock 49 moves vertically downward, its bottom surface engages the upper surface 29 of the female snap fastener 15 and pushes it downward and into engagement with the male fastener 17, as depicted in FIG. 5. Because the diameter of the pin 51 and thus the main portion of the conical lower end 53 is larger than the diameter of the aperture through the pop rivet, the pin lower end pivots easily in the smaller aperture in the rivet head 39 and does not penetrate to any substantial depth where binding might occur. Alternatively, instead of having a narrow passageway in a hollow rivet provide the aperture means, a shallow depression in the male fastener could be provided which would likewise prevent binding. Once mating is effected, the tool 45 is easily withdrawn and moved to the next pair of snap fasteners to interconnect them.

Although a preferred embodiment of the invention has been illustrated in the drawings, it should be understood that various changes and modifications which would be obvious to one having the ordinary skill in this art may be made to the illustrated embodiment without departing from the scope of the invention which is defined by the claims appended hereto. For example, the male fasteners could be disposed on the cover, and the female fasteners affixed to the boat. Various of the features of the invention are set forth in the claims which follow.

What is claimed is:

1. In combination, a pair of mating snap fasteners having connecting parts of generally circular shape, one of said fasteners being adapted for mounting to a fixed object and having aperture means disposed concentrically therein and the other of said fasteners being adapted for mounting to a cover or the like and containing a hole disposed concentrically therein and extending completely therethrough, and a setting tool having a handle, a shank connected to said handle, and pin means extending from said shank, said pin means having a lower end sufficiently small to fit into said aperture means and smaller in cross section than the remainder thereof which is larger than said aperture means so that only said lower end thereof can be inserted thereinto, whereby insertion of said pin means through said hole and into said aperture means facilitates the mating of said snap fasteners because leverage obtained by movement of said handle easily stretches the cover and brings said snap fastener connecting parts into alignment.

2. The invention in accordance with claim 1 wherein said shank includes a cavity for accommodating an upper portion of said pin means and said pin is spring-loaded to the extended position so that, after a pair of mating snap fasteners are brought into alignment, depression of the handle effects retraction of said pin means into said cavity and permits the lower end of said shank to press said pair into final mating engagement.

3. The invention in accordance with claim 2 wherein said pin means is cylindrical and has a generally conical lower end.

4. The invention in accordance with claim 3 wherein said shank has an elongated passageway between said cavity and said lower end wherein said pin means is slidingly disposed.

5. In combination, a pair of mating snap fasteners having connecting parts of generally circular shape, one of said fasteners being adapted for mounting to a fixed object and having aperture means disposed concentrically therein and the other of said fasteners being adapted for mounting to a cover or the like and containing a hole disposed concentrically therein and extending completely therethrough, and a setting tool having a handle, a shank connected to said handle, and pin means extending from said shank, said pin means having a lower end of a size sufficiently small to fit into said aperture means, said shank including a cavity for accommodating an upper portion of said pin means and said pin being spring-loaded to the extended position whereby insertion of said pin means through said hole and into said aperture means facilitates the mating of said snap fasteners because leverage obtained by movement of said handle easily stretches the cover and brings said snap fastener connection parts into alignment, and thereafter depression of the handle effects retraction of said pin means into said cavity and permits the lower end of said shank to press said pair into final mating engagement.

6. The invention in accordance with claim 5 wherein said pin means is cylindrical and has a generally conical lower end.

7. The invention in accordance with claim 6 wherein said shank has an elongated passageway between said cavity and said lower end wherein said pin means is slidingly disposed.

8. The invention in accordance with claim 5 wherein said other of said fasteners is mounted to a tight-fitting cover which must be stretched in order that said snap fasteners can be mated to each other.

\* \* \* \* \*